United States Patent [19]

Fogt

[11] Patent Number: 5,320,506
[45] Date of Patent: Jun. 14, 1994

[54] OLDHAM COUPLING FOR SCROLL COMPRESSOR

[75] Inventor: James F. Fogt, Sidney, Ohio

[73] Assignee: Copeland Corporation, Sidney, Ohio

[21] Appl. No.: 12,630

[22] Filed: Feb. 2, 1993

Related U.S. Application Data

[63] Continuation of Ser. No. 591,443, Oct. 1, 1990, abandoned.

[51] Int. Cl.⁵ .......................... F01C 1/04; F16D 3/04
[52] U.S. Cl. ................... 418/55.3; 418/55.5; 464/105
[58] Field of Search .............. 418/55.3, 55.5, 57; 464/102, 105

[56] References Cited

U.S. PATENT DOCUMENTS

| | | |
|---|---|---|
| 1,255,715 | 2/1918 | Davison . |
| 2,324,168 | 7/1943 | Montelius .......................... 418/55.2 |
| 3,817,664 | 6/1974 | Bennett et al. ..................... 418/57 |
| 3,874,827 | 4/1975 | Young ................................. 418/57 |
| 3,884,599 | 5/1975 | Young et al. ...................... 418/55.3 |
| 4,121,438 | 10/1978 | McCullough ..................... 464/102 |
| 4,160,629 | 7/1979 | Hidden et al. .................... 418/55.3 |
| 4,178,143 | 12/1979 | Thelen et al. ..................... 418/19 |
| 4,259,043 | 3/1981 | Hidden et al. .................... 418/55.3 |
| 4,424,010 | 1/1984 | McCullough ..................... 417/420 |
| 4,431,380 | 2/1984 | Utter .................................. 417/286 |
| 4,522,574 | 6/1985 | Arai et al. ......................... 418/151 |
| 4,534,718 | 8/1985 | Blain .................................. 418/57 |
| 4,609,334 | 9/1986 | Muir et al. ........................ 418/57 |
| 4,655,696 | 4/1987 | Utter .................................. 418/55.3 |
| 4,753,582 | 6/1988 | Morishita et al. ................ 418/57 |
| 4,840,549 | 6/1989 | Morishita et al. ................ 418/57 |
| 4,842,499 | 6/1989 | Nishida et al. ................... 418/84 |
| 4,846,640 | 7/1989 | Nishida et al. ................... 418/94 |
| 4,992,033 | 2/1991 | Caillat et al. ..................... 418/55.3 |
| 5,080,566 | 1/1992 | Sakata et al. ..................... 418/55.3 |

FOREIGN PATENT DOCUMENTS

| | | |
|---|---|---|
| 63-130682 | 8/1988 | Japan . |
| 63-130683 | 8/1988 | Japan . |
| 291488 | 3/1990 | Japan . |
| 2161189 | 6/1990 | Japan ................................. 418/55.3 |
| 350118 | 7/1991 | Japan ................................. 418/55.3 |

Primary Examiner—John J. Vrablik
Attorney, Agent, or Firm—Harness, Dickey & Pierce

[57] ABSTRACT

A scroll-type machine is disclosed which incorporates a unique Oldham coupling for preventing relative rotation between the two scroll members while allowing relative orbital motion therebetween. The Oldham coupling is positioned below the end plate of the orbiting scroll member and includes a first pair of keys slidingly engaging slots in the orbiting scroll and a second pair of keys slidingly engaging slots in the non-orbiting scroll. An optional third key may be provided to slidingly engage a slot in the non-rotating bearing housing.

39 Claims, 3 Drawing Sheets

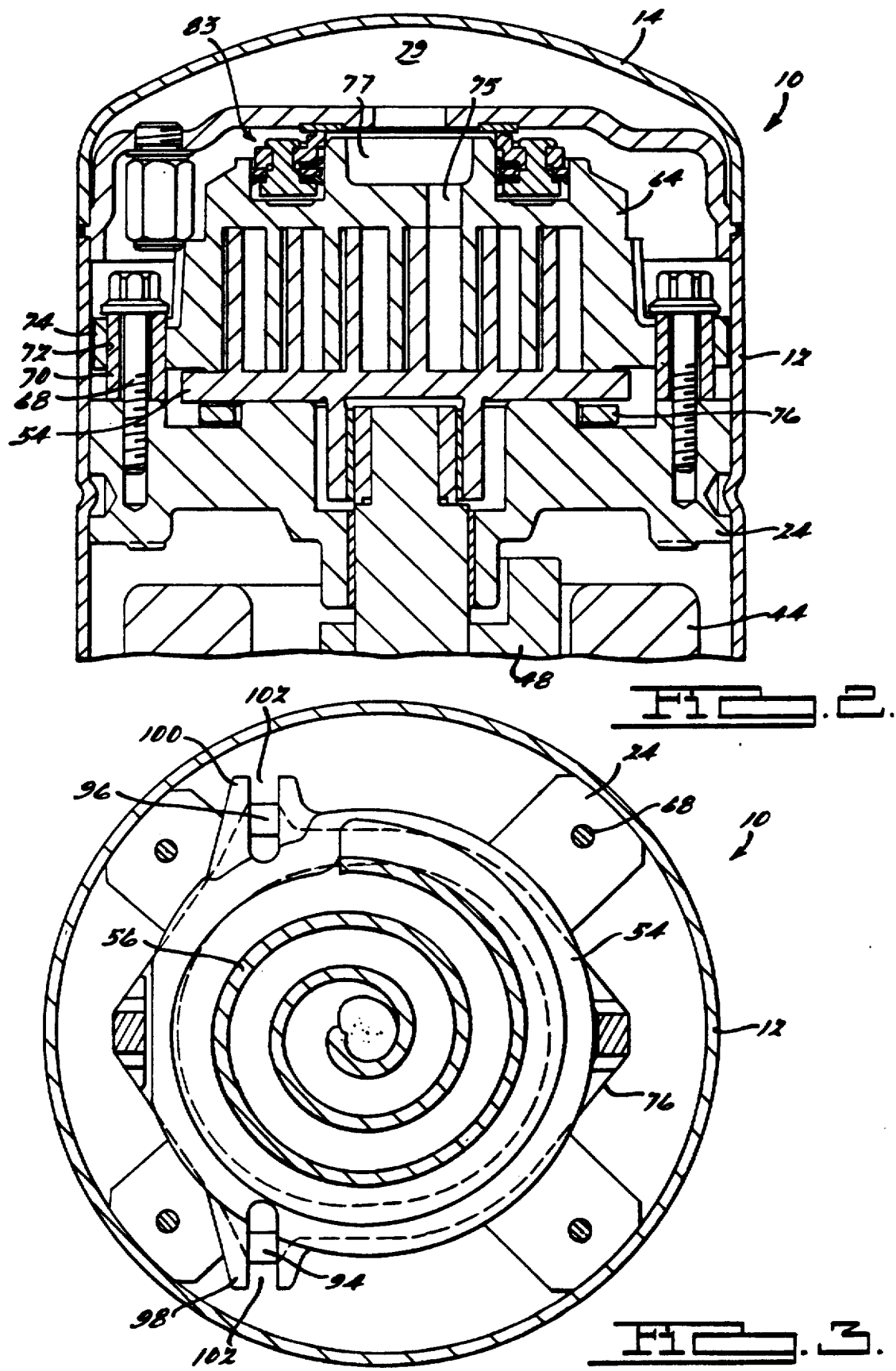

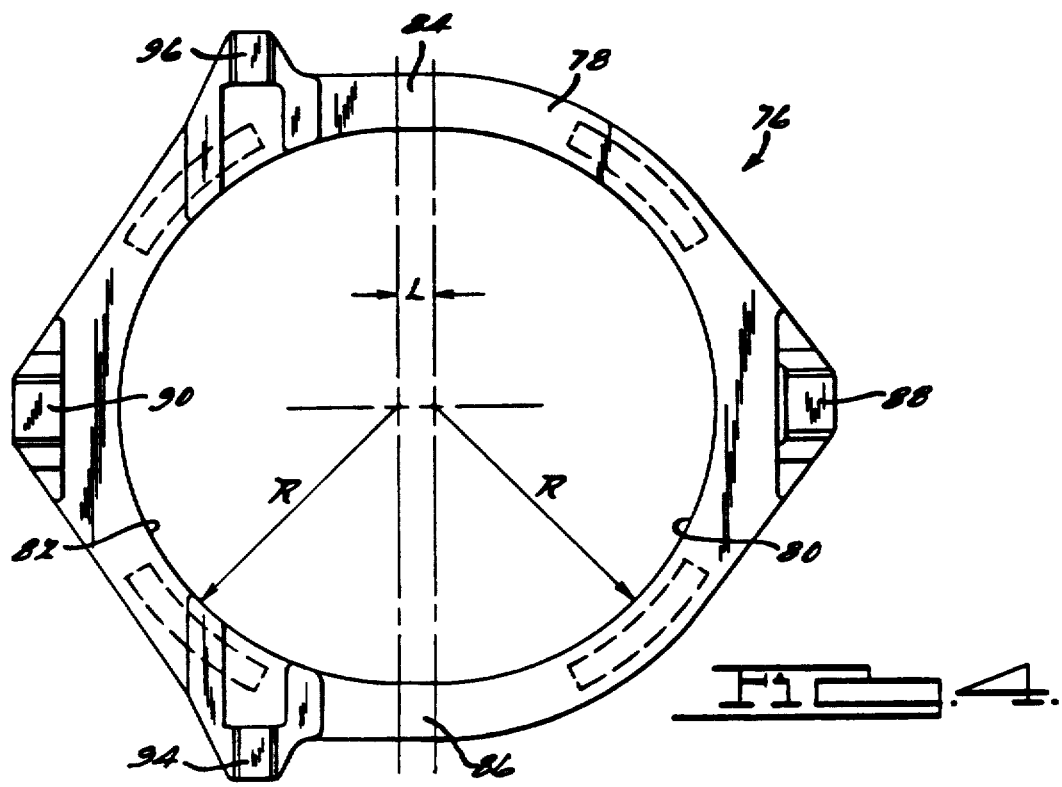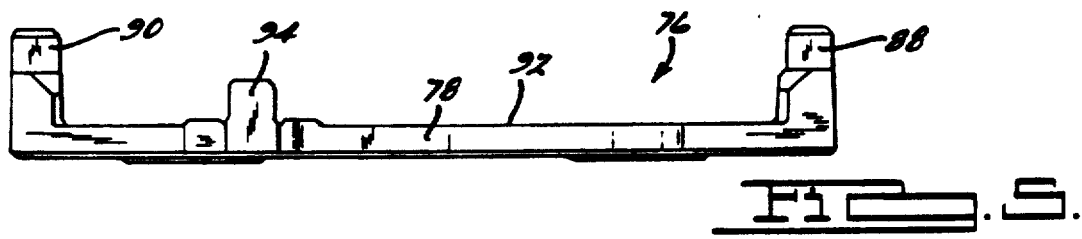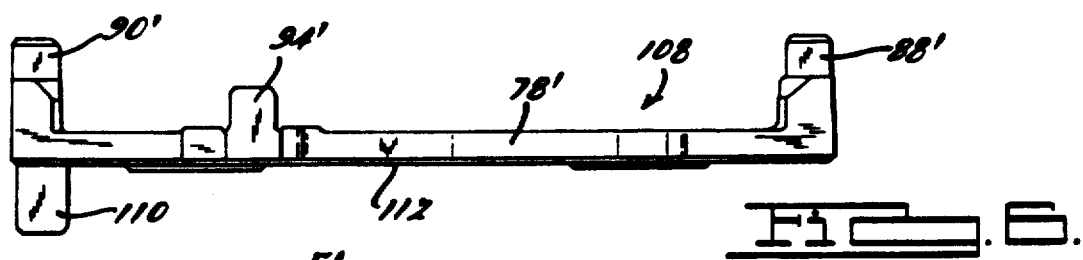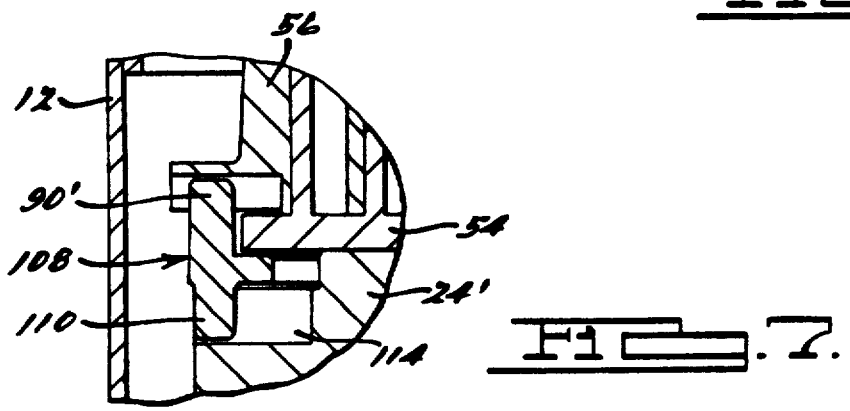

OLDHAM COUPLING FOR SCROLL COMPRESSOR

This is a continuation of U.S. patent application Ser. No. 591,443, filed Oct. 1, 1990, entitled Oldham Coupling for Scroll Compressor, now abandoned.

BACKGROUND AND SUMMARY OF THE INVENTION

The present invention relates generally to scroll machines and more specifically to unique Oldham couplings for use in such scroll-type machines.

Scroll-type machines typically employ a crankshaft operative to drive one of a pair of scroll members in orbital motion with respect to a second interleaved scroll member. In order to prevent relative rotation between the scroll members, Oldham couplings have normally been employed. The Oldham couplings have taken various forms but generally incorporate two or more pairs of keys, each pair projecting in opposite directions form an annular ring member with one pair engaging slots in the orbiting scroll member and the other pair engaging either slots in the non-orbiting scroll member or a stationary body or bearing housing.

While such Oldham couplings which are operative between the respective scroll members are effective to prevent rotation between these respective scroll members, they present design and/or assembly problems in regards to positioning of the coupling between the scroll members. Alternatively, in other applications, additional support structure and/or increased shell size may be required to support the Oldham coupling radially outwardly of the scroll members.

The use of an Oldham coupling acting between the stationary body and one of the scroll members with the other scroll member being mounted to the stationary body simplifies the above design problems but such an arrangement tends to be more costly in that both scrolls must now be accurately positioned with respect to a third element. This third element must then be provided with precise locating and alignment surfaces for each of the two scroll members in order to insure that the two scroll members are accurately rotationally positioned with respect to each other.

The present invention, however, provides an Oldham coupling which is capable of directly interconnecting the two scroll members so as to effectively prevent relative rotation therebetween while avoiding the potential design problems presented by prior designs and also reducing the number of locating and positioning surfaces required. The present invention provides an Oldham coupling positioned in underlying relationship to the orbiting scroll member with first and second pairs of keys all projecting upwardly therefrom into engagement with the respective scroll members. The positioning of the keys and shape of the coupling combines to enable the two scroll members to be directly interconnected so as to both assure positive precise rotational positioning therebetween and to thereafter prevent relative rotation therebetween in an efficient manner without the need to add additional supporting structure therefor nor the need to increase the overall size of the compressor.

Additional advantages and features of the present invention will become apparent from the subsequent description and the appended claims taken in conjunction with the accompanying drawings.

BRIEF DESCRIPTION OF THE DRAWINGS

FIG. 2 is a fragmentary section view similar to that of FIG. 1 but with the section being taken along a plane passing through the non-orbiting scroll mounting arrangement, all in accordance with the present invention;

FIG. 3 is a section view of the refrigeration compressor of FIG. 1, the section being taken along line 3—3 thereof;

FIG. 4 is a plan view of the Oldham coupling incorporated in the refrigeration compressor shown in FIGS. 1-3, all in accordance with the present invention;

FIG. 5 is an elevational view of the Oldham coupling of FIG. 4;

FIG. 6 is a view similar to that of FIG. 5, but showing a modified embodiment of the Oldham coupling in accordance with the present invention; and FIG. 7 is a fragmentary section view of the Oldham coupling of FIG. 6 shown in operative relationship with a scroll-type refrigeration compressor.

DESCRIPTION OF THE PREFERRED EMBODIMENT

Figure 1:
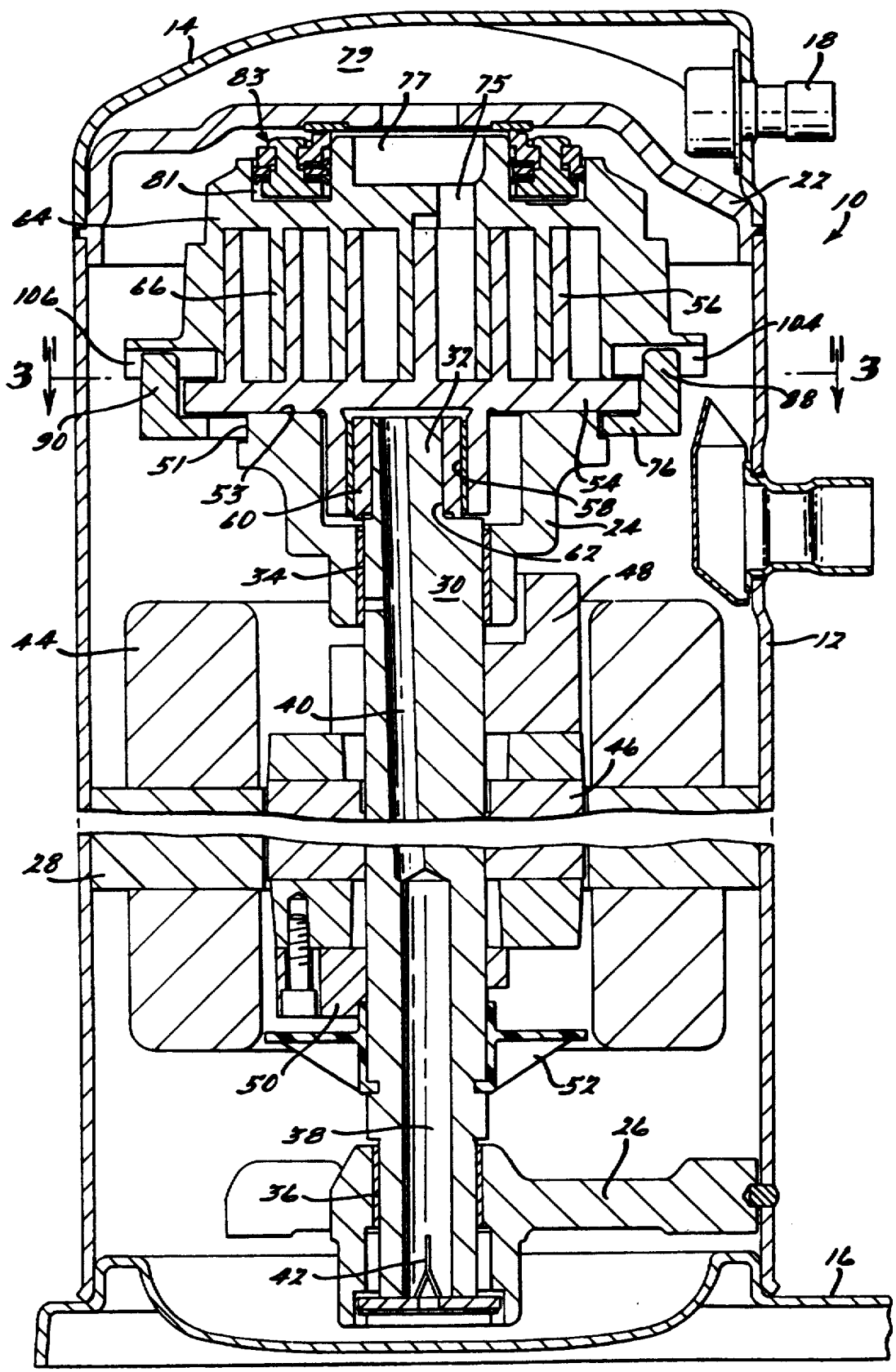
FIG. 1 is a vertical section view of a scroll-type refrigeration compressor in accordance with the present invention.

Referring now to the drawings and in particular to FIG. 1, a compressor 10 is shown which comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to the shell include a transversely extending partition 22 which is welded about its periphery at the same point that cap 14 is welded to shell 12, a main bearing housing 24 which is suitably secured to shell 12 and a lower bearing housing 26 also having a plurality of radially outwardly extending legs each of which is also suitably secured to shell 12. A motor stator 28 which is generally square in cross section but with the corners rounded off is press-fitted into shell 12. The flats between the rounded corners on the stator provide passageways between the stator and shell, which facilitate the flow of lubricant from the top of the shell to the bottom.

A drive shaft or crankshaft 30 having an eccentric crank pin 32 at the upper end thereof is rotatably journaled in a bearing 34 in main bearing housing 24 and a second bearing 36 in lower bearing housing 26. Crankshaft 30 has at the lower end a relatively large diameter concentric bore 38 which communicates with a radially outwardly inclined smaller diameter bore 40 extending upwardly therefrom to the top of the crankshaft. Disposed within bore 38 is a stirrer 42. The lower portion of the interior shell 12 is filled with lubricating oil, and bore 38 acts as a pump to pump lubricating fluid up the crankshaft 30 and into passageway 40 and ultimately to all of the various portions of the compressor which require lubrication.

Crankshaft 30 is rotatively driven by an electric motor including stator 32, windings 44 passing therethrough and a rotor 46 pressfitted on the crankshaft 30 and having upper and lower counterweights 48 and 50 respectively. A counterweight shield 52 may be provided to reduce the work loss caused by counterweight 50 spinning in the oil in the sump. Counterweight shield 52 is more fully disclosed in assignee's copending application Ser. No. 591,442 filed of even date herewith and entitled "Counterweight Shield For Refrigeration Compressor", the disclosure of which is hereby incorporated by reference.

A generally cylindrical upper portion 51 of main bearing housing 24 defines a flat thrust bearing surface 53 on which is supported an orbiting scroll 54 having the usual end plate and spiral vane or wrap 56 projecting from the upper surface thereof. Projecting downwardly from the lower surface of the end plate of orbiting scroll 54 is a cylindrical hub having a journal bearing 58 therein and in which is rotatively disposed a drive bushing 60 having an inner bore 62 in which crank pin 32 is drivingly disposed. Crank pin 32 has a flat on one surface which drivingly engages a flat surface (not shown) formed in a portion of bore 62 to provide a radially compliant driving arrangement, such as disclosed in assignee's U.S. Pat. No. 4,877,382, the disclosure of which is herein incorporated by reference.

A non-orbiting scroll member 64 is also provided having an end plate and wrap 66 projecting therefrom which is positioned in meshing engagement with wrap 56 of scroll 54. Non-orbiting scroll 64 has a centrally disposed discharge passage 75 which communicates with an upwardly open recess 77 which in turn is in fluid communication with a discharge muffler chamber 79 defined by cap 14 and partition 22. An annular recess 81 is also formed in non-orbiting scroll 64 within which is disposed a seal assembly 83. Recesses 77 and 81 and seal assembly 83 cooperate to define axial pressure biasing chambers which receive pressurized fluid being compressed by wraps 56 and 66 so as to exert an axial biasing force on non-orbiting scroll member 64 to thereby urge the tips of respective wraps 56, 66 into sealing engagement with the opposed end plate surfaces. Seal assembly 83 is preferably of the type described in greater detail in assignee's copending application Ser. No. 591,454 filed of even date herewith and entitled "Scroll Machine With Floating Seal", the disclosure of which is hereby incorporated by reference.

As best seen with reference to FIG. 2, non-orbiting scroll member 64 is designed to be mounted to bearing housing 24 by means of a plurality of circumferentially spaced bolts 68 extending through respective bushings 70 which are slidably fitted within bores 72 provided in radially outwardly projecting flange portions 74 integrally formed on non-orbiting scroll member 64. Preferably, the length of bushings 70 will be such as to provide a slight clearance between the lower surface of the head of bolts 68 and the upper surface of flange portion 74 so as to allow a slight axial movement of scroll member 64 in a direction away from scroll member 54. This mounting arrangement, as well as other alternative mounting arrangements, are disclosed in greater detail in applicant's copending application Ser. No. 591,444, filed of even date herewith and entitled "Non-Orbiting Scroll Mounting Arrangements For A Scroll Machine", the disclosure of which is hereby incorporated by reference. Other alternative mounting arrangements are disclosed in the assignee's above referenced U.S. Pat. No. 4,877,382.

In order to prevent relative rotation between scroll members 54 and 64, a unique Oldham coupling 76 is provided being positioned in surrounding relationship to cylindrical portion 51 of main bearing housing 24 and immediately below the end plate of scroll member 54.

As best seen with reference to FIGS. 4 and 5, Oldham coupling 76 includes an annular ring portion 78, the inner periphery of which is non-circular in shape being defined by two generally circular arc segments 80, 82 each of a substantially constant radius R the opposed ends of which are interconnected by substantially straight segments 84, 86 of a length L. Preferably, the radius R of arcs 80 and 82 will be approximately equal to the radius of cylindrical portion 51 provided on main bearing housing 24 plus a small clearance. The length L of straight segments 84, 86 will preferably be approximately equal to twice the radius of the orbit traveled by orbiting scroll member 54 plus a slight clearance.

A pair of keys 88, 90 are provided on annular ring 78 in diametrically aligned relationship and projecting axially upwardly from surface 92 thereof. A second pair of keys 94, 96 are also provided on annular ring 78 also projecting axially upwardly from surface 92 thereof. Keys 94, 96 are also aligned along a line extending parallel to a radius of arc 82 which radius is substantially perpendicular to the diameter along which keys 88 and 90 are aligned but shifted radially toward key 90. Additionally, keys 94 and 96 are positioned on outwardly projecting flange portions. Both the radial shifting and outward positioning of keys 94 and 96 cooperate to enable the size of Oldham coupling 76 to be kept to a minimum for a given size compressor and associated shell diameter while enabling the size of thrust surface 53 to be maximized for this same compressor as well to avoid interference with the location and extent of wrap 56 of orbiting scroll member 54.

As shown in FIG. 3, the end plate of orbiting scroll member 54 is provided with a pair of outwardly projecting flange portions 98, 100 each of which is provided with an outwardly opening slot 102. Slots 102 are sized to slidingly receive respective keys 94, 96. Keys 94, 96 will, of course, have an axial length or height so as to avoid projecting above the upper surface of the end plate of orbiting scroll member 54.

Referring once again to FIG. 1, non-orbiting scroll 64 is similarly provided with a pair of radially extending aligned slots 104, 106 which are designed to receive respective keys 88, 90. Of course, keys 88 and 90 will be substantially longer than keys 94, 96 and of sufficient length to project above the end plate of scroll 54 and remain in engagement with slots 104, 106 throughout the limited axial movement of non-orbiting scroll 64 noted above. It should be noted, however, that preferably a slight clearance will be provided between the end of respective keys 88 and 90 and the overlying surfaces of respective slots 104 and 106 when scroll member 64 is fully seated against scroll member 54 thereby avoiding any possibility of interference with the tip sealing between the respective scroll members.

As may now be appreciated, Oldham coupling 76 serves to directly interconnect and prevent any relative rotation between scroll members 54 and 64 through the cooperative action of the abutment surfaces provided by respective slots 102, 104 106 and associated keys 94, 96, 88, and 90. Similarly, the mounting arrangement of scroll 64 to bearing housing 24 will operate to effectively prevent relative rotation of scroll member 64 with respect to bearing housing 24 and hence also prevent relative rotation of scroll member 54 with respect to bearing housing 24.

An alternative embodiment 108 of Oldham coupling 76 is shown in FIGS. 6 and 7. Oldham coupling 108 is substantially identical to Oldham coupling 76 with the exception that a fifth key 110 is provided thereon projecting axially from surface 112 thereof in a direction opposite from that of keys 88', 90', 94', 96'. Key 110 is preferably axially aligned with key 90' and is designed to be received within a slot 114 provided in main bearing housing 24'. As such, key 110 will cooperate with the abutment surfaces defined by slot 114 provided in main bearing housing 24' to thereby prevent relative rotation of both scroll members 54 and 64 with respect thereto without regard to reliance upon the non-orbiting scroll mounting arrangement. While, as described above, only a single key 110 is provided for engagement with sot 114 in bearing housing 24', if desired, a sixth key could also be added diametrically aligned with key 110 and adapted to be received within a similarly aligned second slot provided in bearing housing 24'.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A scroll-type machine comprising:
   a first scroll member having a first spiral wrap projecting outwardly from an end plate;
   a second scroll member having a second spiral wrap projecting outwardly from an end plate and interleaved with said first spiral wrap to define a plurality of moving fluid chambers therebetween when said second scroll member orbits with respect to said first scroll member;
   fixed means for supporting both said scroll members;
   drive means for causing said first and second scroll members to orbit with respect to one another; and
   Oldham coupling means for preventing relative rotational movement between said first and second scroll members, said Oldham coupling means including an annular ring, a first pair of aligned abutment surfaces provided on said ring operatively associated with said first scroll member to prevent relative rotation between said coupling and said first scroll member and a second pair of aligned abutment surfaces provided on said ring and aligned at right angles to said first pair of abutment surfaces, said second pair of abutment surfaces being operatively associated with said second scroll member to prevent relative rotation between said coupling and said second scroll member, said second pair of abutment surfaces further defining a line offset from the center of said ring.

2. A scroll-type machine as claimed in claim 1 wherein said Oldham coupling means is positioned in surrounding relationship to an axial thrust surface.

3. A scroll-type machine as claimed in claim 1 wherein said first pair of abutment surfaces comprise a first pair of keys on one face of said annular ring, said one face facing the side opposite said second spiral wrap of said second scroll member end plate.

4. A scroll-type machine as claimed in claim 3 wherein said second pair of abutment surfaces comprise a second pair of keys on said one face.

5. A scroll-type machine as claimed in claim 4 wherein said first pair of keys project axially beyond said second scroll member end plate in radially outwardly spaced relationship to said second scroll member end plate.

6. A scroll-type machine as claimed in claim 1 further comprising means for preventing relative rotation between said first scroll member and said fixed means.

7. A scroll-type machine as claimed in claim 6 wherein said rotation preventing means comprise axially compliant mounting means for mounting said first scroll member to said bearing housing, said axial compliant mounting means permitting limited axial movement of said first scroll member.

8. A scroll-type machine as claimed in claim 1 wherein the inner peripheral surface of said annular ring is non-circular comprising at opposite ends circular arcs of equal radius and relatively straight portions interconnecting said arcs.

9. A scroll-type machine comprising:
   a fixed body having a portion which is generally circular about the machine axis;
   a non-orbiting scroll member;
   an orbital scroll member mounted for orbital movement about said axis with respect to said non-orbiting scroll member whereby said non-orbiting scroll member is interleaved with said orbital scroll member to define a plurality of moving fluid chambers therebetween when said orbital scroll member orbits with respect to said non-orbiting scroll member;
   means for causing said orbital scroll member to orbit with respect to said non-orbiting scroll member; and
   compact Oldham coupling means for preventing rotational movement of said orbital scroll member with respect to said non-orbiting scroll member comprising:
   means defining generally diametrically aligned first abutment surfaces on said non-orbiting scroll member;
   means defining generally aligned second abutment surfaces on said orbital scroll member, arranged at right angles to said first abutment surfaces;
   a transversely disposed annular ring member generally surrounding said circular body portion;
   a first pair of keys projecting axially from one face of said ring member into linear sliding engagement with said first abutment surfaces to prevent relative rotation between said non-orbiting scroll member and said ring member; and
   a second pair of keys projecting axially from said one face of said ring member into linear sliding engagement with said second abutment surfaces to prevent relative rotation between said orbital scroll member and said ring member, said second pair of keys defining a line offset from said machine axis.

10. A scroll-type machine as claimed in claim 9, wherein the minimum inner diameter of said annular ring member is equal to the diameter of said circular body portion plus a predetermined minimal clearance.

11. A scroll-type machine as claimed in claim 10, wherein said circular body portion defines a flat transverse thrust bearing surface on said body slidingly supporting said orbital scroll member.

12. A scroll-type machine as claimed in claim 9, wherein said first aligned abutment surfaces are a pair of radial slots in said non-orbiting scroll member disposed on diametrically opposite sides of said axis.

13. A scroll-type machine as claimed in claim 9, wherein said second aligned abutment surfaces are a pair of slots in said orbiting scroll member disposed on opposite sides of said axis.

14. A scroll-type machine as claimed in claim 9 further comprising a third abutment surface on said body and a third key on the opposite face of said annular ring, said third key being in linear sliding engagement with said third abutment surface to thereby prevent relative rotation of said Oldham coupling with respect to said body.

15. A scroll-type machine as claimed in claim 14 wherein said third abutment surface and said third key are aligned in an axial direction with one of said first pair of keys.

16. A scroll-type machine comprising:
a housing having a generally circular body portion defining an axial thrust surface;
a first scroll member supported on said axial thrust surface of said housing, said first scroll member having a pair of aligned slots provided thereon;
means for causing said first scroll member to orbit with respect to said housing;
a second scroll member having a pair of diametrically aligned slots, said first scroll member slots being aligned at right angles to said second scroll member slots;
means for mounting said second scroll member relative to said housing;
said first and second scroll members interleaved to define a plurality of moving fluid chambers therebetween when one scroll member orbits with respect to the other scroll member;
and Oldham coupling means for preventing relative rotation between said first and second scroll members, said Oldham coupling including an annular ring having radically outwardly projecting flange portions positioned in surrounding relationship to said circular body portion, a first pair of keys projecting into sliding engagement with respect to said first scroll member slots and a second pair of diametrically aligned keys projecting from said flanges into sliding engagement with respect to said second scroll member slots, said annular ring being positioned below said axial thrust surface.

17. A scroll-type machine as claimed in claim 16 wherein said second pair of keys are positioned radially outwardly of said first scroll member.

18. A scroll-type machine as claimed in claim 16 wherein said mounting means is operative to prevent relative rotation of said second scroll member with respect to said housing.

19. A scroll-type machine as claimed in claim 16 further comprising a third key on said annular ring and a radially extending slot provided in said housing, said third key projecting into sliding engagement with said third slot.

20. A fluid scroll machine comprising:
a fixed frame;
a fixed mechanism including first and second scroll members which have end plates opposed to each other at a certain interval and spiral wraps projecting from the end plates to alternately overlap one upon the other;
an Oldham coupling movably supported in the scroll machine and including:
a ring-shaped plate having a first side facing the end plate of the first scroll member, an axis center, and at least one flange projecting radially outward from said axis center;
a pair of first projections projected from the first side of the ring-shaped plate and positioned on a line which extends in a first direction; and
a pair of second projections projected from the first side of the ring-shaped plate and positioned on another line which extends in a second direction perpendicular to the first direction wherein at least one of said second projections projects from said at least one flange;
a pair of first guide passages included in said first scroll member extending in the first direction of the ring-shaped plate for allowing the first projections to slide relative to said first scroll member in the first direction;
a pair of second guide passages included in said scroll machine extending in the second direction of the ring-shaped plate for allowing the second projections to slide in the second direction and thereby prevent relative rotation between said scroll members; and
a means for orbiting the first scroll member with respect to the second scroll member.

21. The fluid scroll machine according to claim 20, wherein said second guide passages are further separated from the ring-shaped plate than said first guide passages, and said second projections are longer than said first projections.

22. The fluid scroll machine according to claim 21, wherein said second scroll member is fixed to the fixed frame and said second guide passages are formed in said end plate of said second scroll member.

23. The fluid scroll machine according to claim 20 wherein said second guide passages are in said second scroll member.

24. The fluid scroll machine according to claim 20 wherein one of said lines extends through the axis center of the ring-shaped plate and the other of said lines is offset from said axis center.

25. The fluid scroll machine according to claim 20 wherein the end plate of said first scroll member is disposed between said ring-shaped plate and said second scroll member.

26. A fluid scroll machine comprising:
a fixed frame;
a fluid mechanism including first and second scroll members which have end plates opposed to each other at a certain interval and spiral wraps projecting from the end plates to alternately overlap one upon the other;
an Oldham coupling movably supported by the fixed frame and including:
a ring-shaped plate having a first side facing the end plate of the first scroll member, an axis center, and flanges projecting radially outward;
a pair of first projections projected from the first side of the ring-shaped plate and positioned on a line which extends in a first radial direction to pass through the axis center of the ring-shaped plate; and
a pair of second projections projected from the first side of said flanges of the ring-shaped plate and positioned on another line which extends in a second direction perpendicular to the first radial direction;
a pair of first guide passages included in one of said scroll members extending in the first radial direction of the ring-shaped plate for allowing the first projections to slide in the first radial direction;

a pair of second guide passages included in the other of said scroll members extending in the second direction of the ring-shaped plate for allowing the second projections to slide relative to said other scroll member in the second direction; and means for orbiting said other scroll member with respect to said one scroll member.

27. A fluid scroll machine comprising:

a fixed frame;

a fluid mechanism including first and second scroll members which have end plates opposed to each other at a certain interval and spiral wraps projecting from the end plates to alternately overlap one upon the other;

an Oldham coupling movably supported by the fixed frame and including:

a ring-shaped plate having a first side facing the end plate of the first scroll member and an axis center, a pair of first projections projected from the first side of the ring-shaped plate and positioned on a line which extends in a first radial direction, and a pair of second projections projected from the first side of the ring-shaped plate and positioned on another line which extends in a second direction perpendicular to the first radial direction;

a pair of first guide passages included in one of the said scroll members extending in the first radial direction of the ring-shaped plate for allowing the first projections to slide in the first radial direction;

a pair of second guide passages included in the other of said scroll members extending in the second direction of the ring-shaped plate for allowing the second projections to slide relative to said other scroll member in the second direction; and means for orbiting said one scroll member with respect to said other scroll member.

28. An Oldham coupling for use in a scroll-type machine having a first and second scroll member comprising:

an annular ring having a first face and an axis center;

a pair of first projections projecting from said first face defining a first line and engaging said first scroll member to maintain a relatively fixed angular relationship between said Oldham ring and said first scroll member;

a pair of second projections projecting from said first face defining a second line and engaging said second scroll member for maintaining a relatively fixed angular relationship between said Oldham coupling and said second scroll member;

at least one of said lines being offset from the axis center.

29. An Oldham coupling for use in a scroll machine to assist in maintaining a relatively fixed angular relationship between first and second scroll members comprising:

an annular ring having a first face and an axis center;

first two aligned pairs of abutment surfaces provided on said first face for operable association with said first scroll member to prevent relative rotation between said coupling and said first scroll member and defining a first line;

second two aligned pairs of abutment surfaces provided on said first face defining a second line at right angles to said first line and offset from said axis center, said second two pairs of abutment surfaces being operatively associated with said second scroll member to prevent relative rotation between said coupling and said second scroll member.

30. The Oldham ring of claim 29 wherein said second two pairs of abutment surfaces are positioned on radially outwardly projecting flange portions of said ring;

31. The Oldham coupling of claim 29 wherein said ring portion further comprises a non-circular inner periphery, generally defined by first and second circular arc segments interconnected by substantially straight segments of length L.

32. The Oldham ring of claim 31 wherein said first line passes through the center of said ring;

33. The Oldham ring of claim 29 wherein said first two pairs abutment surfaces comprises a first pair of keys, each of said keys of said first pair of keys being centered on said first line.

34. The Oldham ring of claim 33 wherein said second two pairs of abutment surfaces comprise a second pair of keys, each of said second pair of keys being centered on said second line.

35. A scroll type machine comprising:

a fixed body;

a non-orbiting scroll member;

an orbital scroll member mounted for orbital movement with respect to said non-orbiting scroll member;

means for causing said orbital scroll member to orbit with respect to said non-orbiting scroll member whereby said non-orbiting scroll member is interleaved with said orbital scroll member to define a plurality of moving fluid chambers therebetween when said orbital scroll member orbits with respect to said non-orbiting scroll member; and Oldham coupling means for preventing rotational movement of said orbital scroll member with respect to said non-orbiting scroll member comprising:

first abutment surfaces on said non-orbiting scroll member;

second abutment surfaces on said orbital scroll member arranged at right angles to said first abutment surfaces;

a ring member having a center and an inner peripheral surface comprising, at opposite ends, circular arcs of equal radius, the centers of curvature of said arcs being spaced apart a predetermined distance L and relatively straight portions connecting said arcs;

a first pair of keys, defining a first line and projecting axially from one face of said ring member into engagement with said first abutment surfaces to prevent relative rotation between said non-orbiting scroll member in said ring member; and a second pair of keys defining a second line and projecting axially from said one face of said ring member into engagement with said second abutment surfaces to prevent relative rotation between said orbital scroll member and said ring member, said second line being disposed at a right angle to said first line and not passing through said center.

36. The scroll machine of claim 35 wherein said first line passes through said center.

37. The scroll machine of claim 35 wherein said engagement is linear sliding engagement.

38. Wherein the scroll machine of claim 35 wherein distance L is equal to about twice the radius of the orbit travelled by the orbital scroll member.

39. The scroll machine of claim 35 wherein said first pair of keys project further from said one face than said second pair of keys.

* * * * *

UNITED STATES PATENT AND TRADEMARK OFFICE
CERTIFICATE OF CORRECTION

PATENT NO. : 5,320,506
DATED : June 14, 1994
INVENTOR(S) : James F. Fogt

It is certified that error appears in the above-indentified patent and that said Letters Patent is hereby corrected as shown below:

Column 1, line 19, "The" should be -- These --.

Column 1, line 22, "form" should be -- from --.

Column 1, line 28, after "prevent" insert -- relative --.

Column 4, line 29, after "well" insert -- as --.

Column 5, line 13, "sot" should be -- slot --.

Column 7, line 34, "radically" should be -- radially --.

Column 7, line 58, "fixed" should be -- fluid --.

Column 9, line 26, delete "the".

Column 10, line 3, ";" should be -- . --.

Column 10, line 10, ";" should be -- . --.

Column 10, line 12, after "pairs" insert -- of --.

Column 10, line 12, "comprises" should be -- comprise --.

UNITED STATES PATENT AND TRADEMARK OFFICE
CERTIFICATE OF CORRECTION

PATENT NO. : 5,320,506
DATED : June 14, 1994
INVENTOR(S) : James F. Fogt

It is certified that error appears in the above-indentified patent and that said Letters Patent is hereby corrected as shown below:

Column 10, line 62, "Wherein the" should be -- The --.

Signed and Sealed this

Sixteenth Day of May, 1995

Attest:

BRUCE LEHMAN

Attesting Officer       Commissioner of Patents and Trademarks